(12) United States Patent
Schmidt

(10) Patent No.: US 7,941,497 B2
(45) Date of Patent: May 10, 2011

(54) COMMUNITY-BASED METHOD AND SYSTEM FOR CREATING AND SUBSCRIBING TO DYNAMIC PUSH CHANNELS

(75) Inventor: David Schmidt, Cambridge (CA)

(73) Assignee: Research In Motion Limited, Waterloo, Ontario (CA)

( * ) Notice: Subject to any disclaimer, the term of this patent is extended or adjusted under 35 U.S.C. 154(b) by 592 days.

(21) Appl. No.: 11/677,844

(22) Filed: Feb. 22, 2007

(65) Prior Publication Data

US 2008/0209000 A1      Aug. 28, 2008

(51) Int. Cl.
G06F 15/16 (2006.01)
(52) U.S. Cl. .................. 709/207; 709/201; 709/203
(58) Field of Classification Search .......... 709/201, 709/203, 207
See application file for complete search history.

(56) References Cited

U.S. PATENT DOCUMENTS

| | | | | |
|---|---|---|---|---|
| 5,983,268 A | * | 11/1999 | Freivald et al. | 709/218 |
| 6,029,175 A | * | 2/2000 | Chow et al. | 707/104.1 |
| 6,763,388 B1 | * | 7/2004 | Tsimelzon | 709/228 |
| 7,076,244 B2 | * | 7/2006 | Lazaridis et al. | 455/414.2 |
| 2002/0010760 A1 | * | 1/2002 | Armenta et al. | 709/219 |
| 2002/0059457 A1 | * | 5/2002 | Ballard et al. | 709/246 |
| 2002/0111164 A1 | | 8/2002 | Ritter | |
| 2002/0143813 A1 | * | 10/2002 | Jellum et al. | 707/511 |
| 2007/0204022 A1 | * | 8/2007 | Hsu et al. | 709/223 |

OTHER PUBLICATIONS

Lui et al., "WebCQ—Detecting and Delivering Information Changes on the Web", 2000, retrieved from http://citeseerx.ist.psu.edu/viewdoc/download?doi=10.1.1.11.8203&rep=rep1&type=pdf on Dec. 13, 2010.*
Kemeny, Michael First Examination Report for EP 07102926.8, Dec. 21, 2007.
Kemeny, Michael, Second Examination Report for EP 07102926.8, Oct. 24, 2008.
Kemeny, Michael, "EESR", Extended European Search Report for EP 07102926.8, Jul. 3, 2007.

* cited by examiner

*Primary Examiner* — Joon H Hwang
*Assistant Examiner* — Thomas Lee

(57) ABSTRACT

A system and method are provided for allowing a user to define and subscribe to channels of information to be pushed to a wireless device. In defining a channel a specific area of a web page is selected by the user to be monitored for change. The user may also select data to be pushed should a change be detected. A regular expression is created to match the area of interest for changes and if changes occur to push the desired content to the wireless device. Icons on the wireless device alert the user to any unread pushed content. Users may also subscribe to predefined channels, or modify predefined channels should they have the security authorization to do so.

19 Claims, 8 Drawing Sheets

| Name | Title | Category | Unread Icon URL | Read Icon URL | Monitor Page URL | Change Expression |
|---|---|---|---|---|---|---|
| weatherwat | Waterloo Weather Forecast | News | <URL> | <URL> | <URL> | Forecast<h3>.*<dt>.*Issued.*</dt> |
| G&M | Globe and Mail (Mobile) | News | <URL> | <URL> | <URL> | <!--Time/Date stamp begins-->.*<!--Time/Date stamp ends--> |
| cnnhead | CNN Headlines | News | <URL> | <URL> | <URL> | <div class="cnnMain T1Hd"">\s.*<h2>.*</h2>\s.*</div> |
| mars | Mars Mission Status | Technology | <URL> | <URL> | <URL> | <p><strong>.*?</strong><em> |

- Channel Name — 134
- Channel Title — 136
- Channel Category — 138
- Unread Icon URL — 140
- Read Icon URL — 142
- Monitor Page URL — 144
- Change Expression — 146

FIG. 7

COMMUNITY-BASED METHOD AND SYSTEM FOR CREATING AND SUBSCRIBING TO DYNAMIC PUSH CHANNELS

BACKGROUND

In using wireless computing devices, a user may wish to have content pushed to them via a channel. Each channel is specific to the type of content. Examples of content delivered by a channel are updates on stock market prices, sports scores or news. The prior art requires that a channel be established by a software developer familiar with the programming needed to create a channel and determine which content should be pushed to the user of a computing device.

BRIEF DESCRIPTION OF THE DRAWINGS

Embodiments are illustrated by way of example and without limitation in the figures of the accompanying drawings, in which like reference numerals indicate corresponding, analogous or similar elements, and in which:

FIG. 7 is a screen mockup of a channel management interface.

DETAILED DESCRIPTION

Embodiments of the invention described herein provide the ability for a user to simply create a channel and select the content to be pushed.

Figure 1:
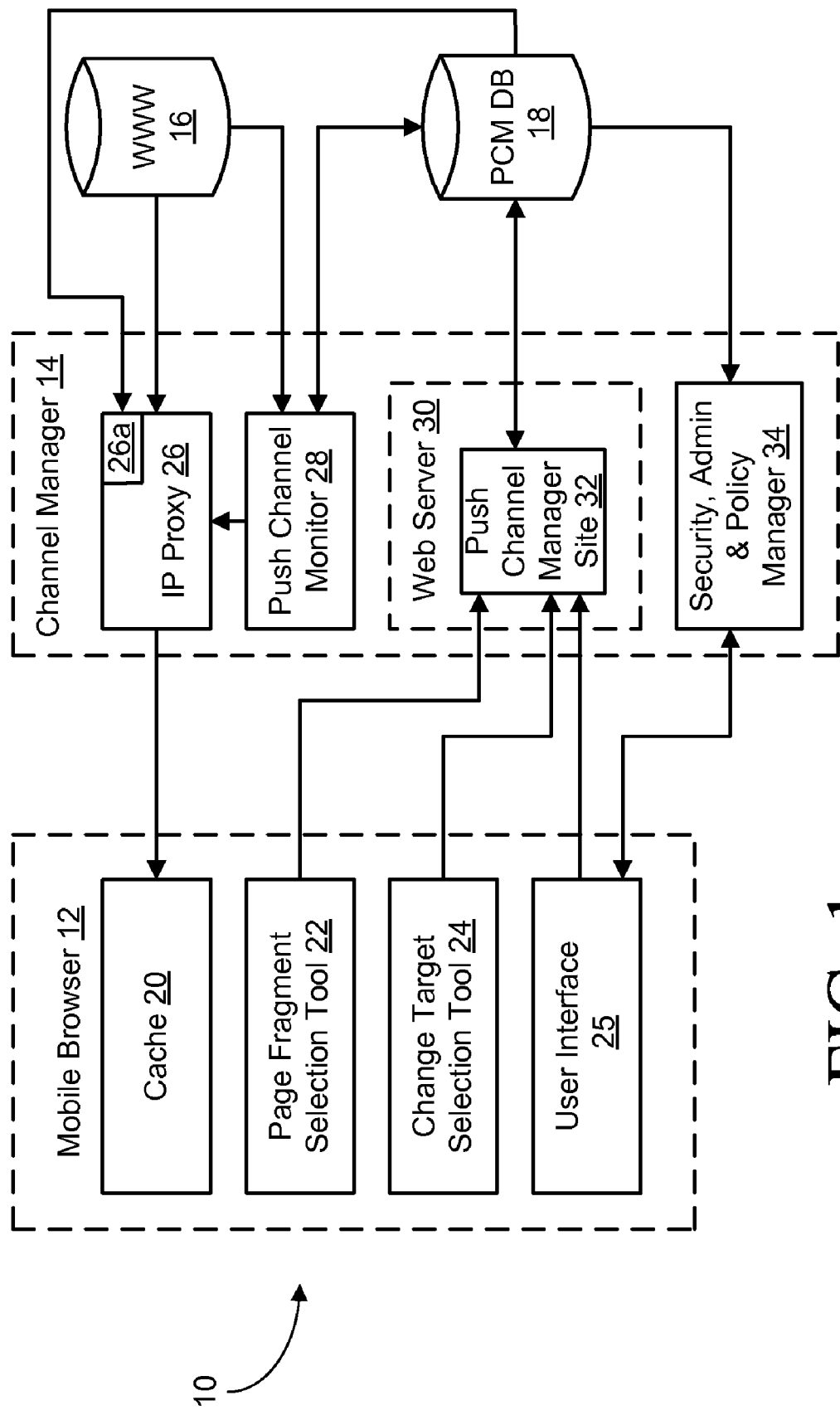
FIG. 1 is a block diagram of a system comprising components of an embodiment of the present invention.

Referring first to FIG. 1, a block diagram of a system comprising components of an embodiment of the present invention is shown generally as 10. System 10 comprises a mobile browser 12, a channel manager 14 and two persistent database sources. The first database source is shown as feature 16 and indicates data available on the World Wide Web. Push Channel Manager (PCM) database 18 is a repository for channel and access information stored by Push Channel Manager (PCM) site 32.

Mobile browser 12 resides on a computing device utilizing wireless technology and comprises a memory cache 20, a page fragment selection tool 22, a change target selection tool 24 and a user interface 25.

Cache 20 is a memory cache to store information provided by channel manager 14 to be viewed by a user. Page fragment selection tool 22 provides a user with the functionality to select the information on a website for which they wish to establish a channel to provide updates should the information change, the selected information hereinafter referred to as a fragment. Change target selection tool 24 allows the user to select what information on the website they wish to be pushed on the channel should a change occur. In one case it would be the Uniform Resource Locator (URL) of the page selected by page fragment selection tool 22. In another case it would be a specific area of the website, for example the text only, excluding such features as menu items, graphics or sidebars. User interface 25 allows the user of mobile browser 12 to invoke and utilize page fragment selection tool 22 and change target selection tool 24. In addition user interface 25 may provide the user with a channel manager interface to allow the user to directly create channels or to modify the information on a channel provided they have the authority to do so. This additional functionality is discussed in more detail with reference to FIG. 7.

Channel manager 14 comprises a plurality of components that may reside on a single computing device or be distributed. In the embodiment shown, IP Proxy 26 is responsible for pushing content on the channel defined by the user. Modules such as IP Proxy 26 that are able to push updated information to mobile devices are known in the art. What information to push is determined by a Change Target Transcoder (CTT) 26a which takes information indicating a change on a website has occurred from push channel monitor 28 and scans PCM database 18 for a definition of what information should be pushed. When a change target is less than the complete URL, CTT 26a ensures that only the content of the change target is pushed to subscribers of the channel.

Push Channel Monitor 28 is responsible for detecting changes in the content selected by the user and informing IP Proxy 26 of the changes so they may be pushed to the channel defined by the user. Webserver 30 is where the Push Channel Manager site 32 resides. PCM site 32 receives a request to define a channel from change target selection tool 24 or user interface 25 and in turn stores this request information in PCM database 18 as channel definition information. Channel definition information stored in PCM database 18 may include:

a) A short name of the channel, for example "weathcam".

b) A longer name, for example "Cambridge Weather Forecast".

c) A category, for example "weather".

d) A link to an icon to be displayed on user interface 25 indicating that information from the channel is unread.

e) A link to an icon to be displayed on user interface 25 indicating that all information from the channel has been read.

f) The URL of the page to monitor.

g) A change expression utilized to determine when changes have occurred in the fragment to be monitored.

Examples of values of this information are shown in FIG. 7.

Security, administration and policy manager 34 is responsible for ensuring secure access to the modules of channel manager 14. Examples would include storing rules in PCM database 18 on who can access a channel, who can modify channel definition information and how a channel may be deleted.

For the reader to better understand the interactions of the above referenced features we provide the following overview.

1) Page fragment selection tool 22 permits the user to select a page fragment on a website that they wish to have monitored for changes and passes information to identify the page fragment to PCM site 32.

2) Change target selection tool 24 permits the user to select what information they wish to receive once the page fragment selected through the use of page fragment selection tool 22 has changed and passes that information to PCM site 32.

3) PCM site 32 maintains user registration, subscriptions and channel definition information in PCM database 18.

4) Push channel monitor 28 scans both databases 16 and 18 and sends directives on any changes relative to a channel to IP Proxy 26.

We will now discuss how each of the above referenced features accomplishes the functions described in points 1) to 4) above.

Figure 2:
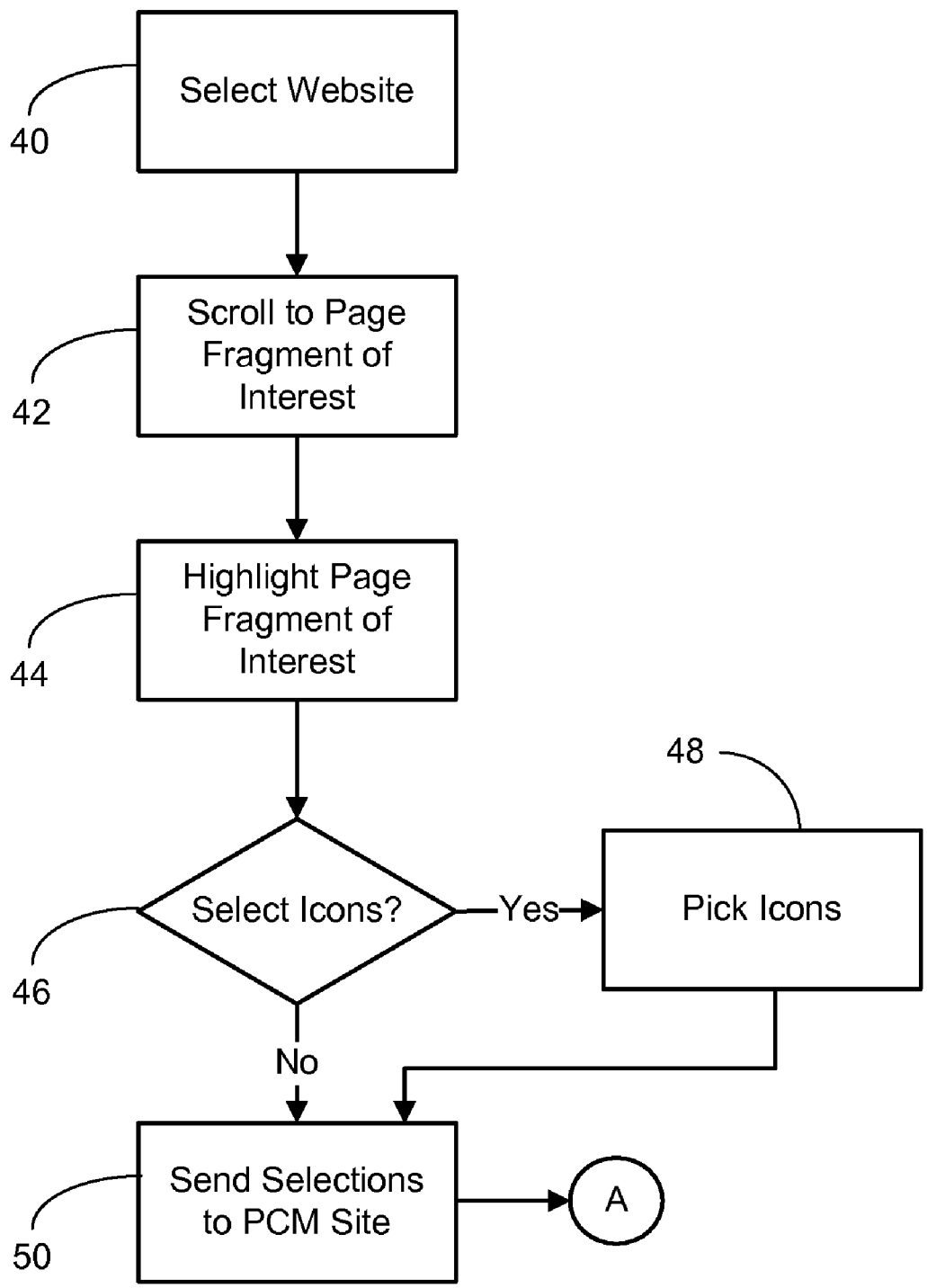
FIG. 2 is a flowchart of the function of a page fragment selection tool.

Referring now to FIG. 2 a flowchart of the function of page fragment selection tool 22 is shown. At step 40 through the use of user interface 25, a user selects a website containing information for which they wish to create a channel. At step 42 the user through user interface 25 scrolls to a page fragment of interest to be monitored for changes. Examples of page fragments include text such as a headline on a news site, an image or any other content on the site the user wishes to monitor for changes. At step 44 the user through user interface 25 highlights the page fragment of interest. Step 44 obtains all related HTML tags such as: <a>, <div>, <td>, <tr>, and others to identify the page fragment. At step 46 the user may optionally select two icons, to serve as read and unread icons for the new channel to be displayed on user interface 25. Alternatively a single icon could be selected with the checkmark or other indicia to indicate read or unread status. If the user wishes to select an icon processing moves to step 48 where the user selects a website containing the icons to be used, and picks the icons this may be same website selected when creating the channel or could be another website, for example a page containing a set of icons. After step 48 is complete, processing then moves to step 50. If at step 46 the user declines to select icons processing a default icon is created and processing moves to step 50. At step 50 information regarding the page fragment of interest and icon(s) are sent to PCM site 32.

Figure 3:
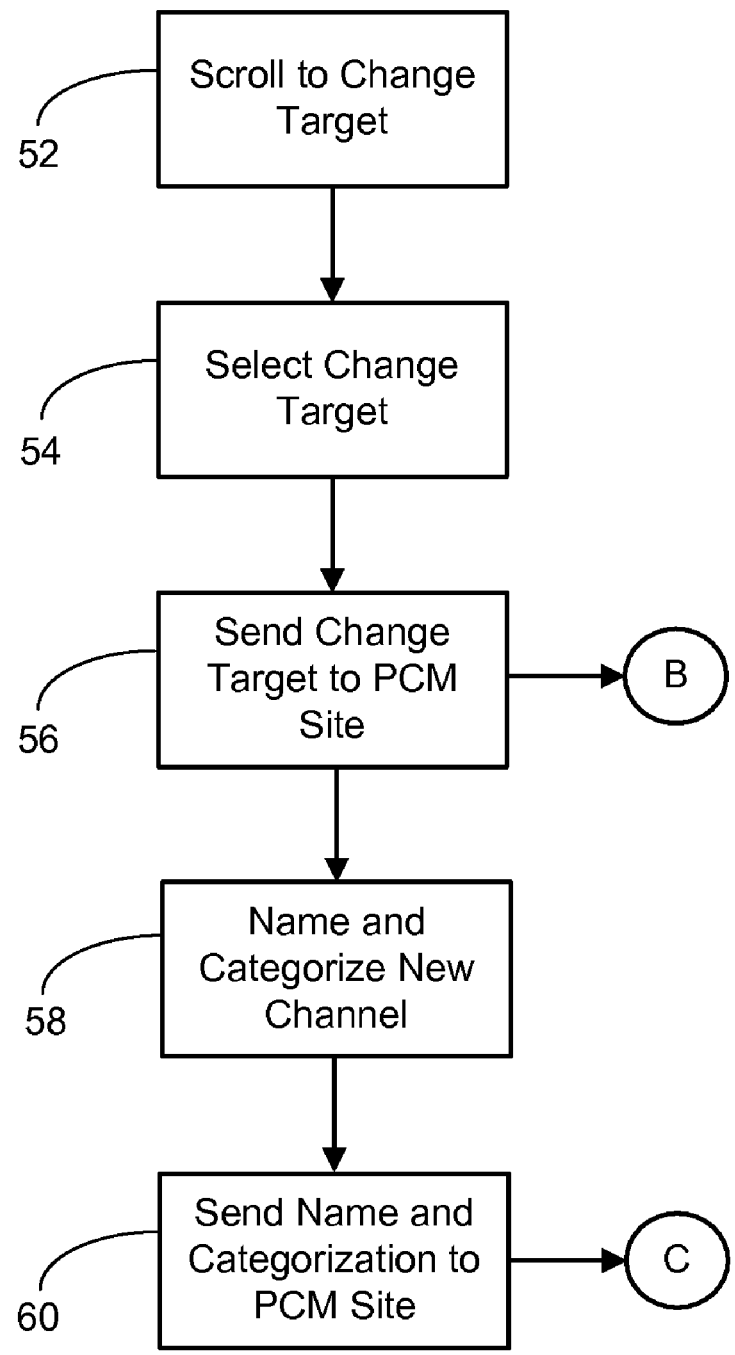
FIG. 3 is a flowchart of the function of a change target selection tool.

Referring now to FIG. 3 a flowchart of the function of the change target selection tool 24 is shown. Beginning at step 52 through the use of user interface 25 the user scrolls to a change target area on the website of interest that they wish to have pushed to mobile browser 12. The change target area defines the information that the user wishes to receive on mobile browser 12. At step 54 the change target is selected through the use of user interface 25, this step allows the user to select specific text or images, for example a change target may be the text in the body of a website, not the images, sidebars or menu items. In this case the change target will include immediately surrounding HTML tags and embedded tags in the change target and the URL of the change target. Alternatively it may simply be a URL. At step 56 the information defining the change target is sent to PCM site 32. At step 58 the user is prompted by user interface 25 to provide a name and category for the new channel. The name is a user defined name for the channel and the category may be unique or selected from a list such as "weather", "news", "technology" or others. At step 60 the name and categorization information provided at step 58 is sent to PCM site 32.

Figure 4:
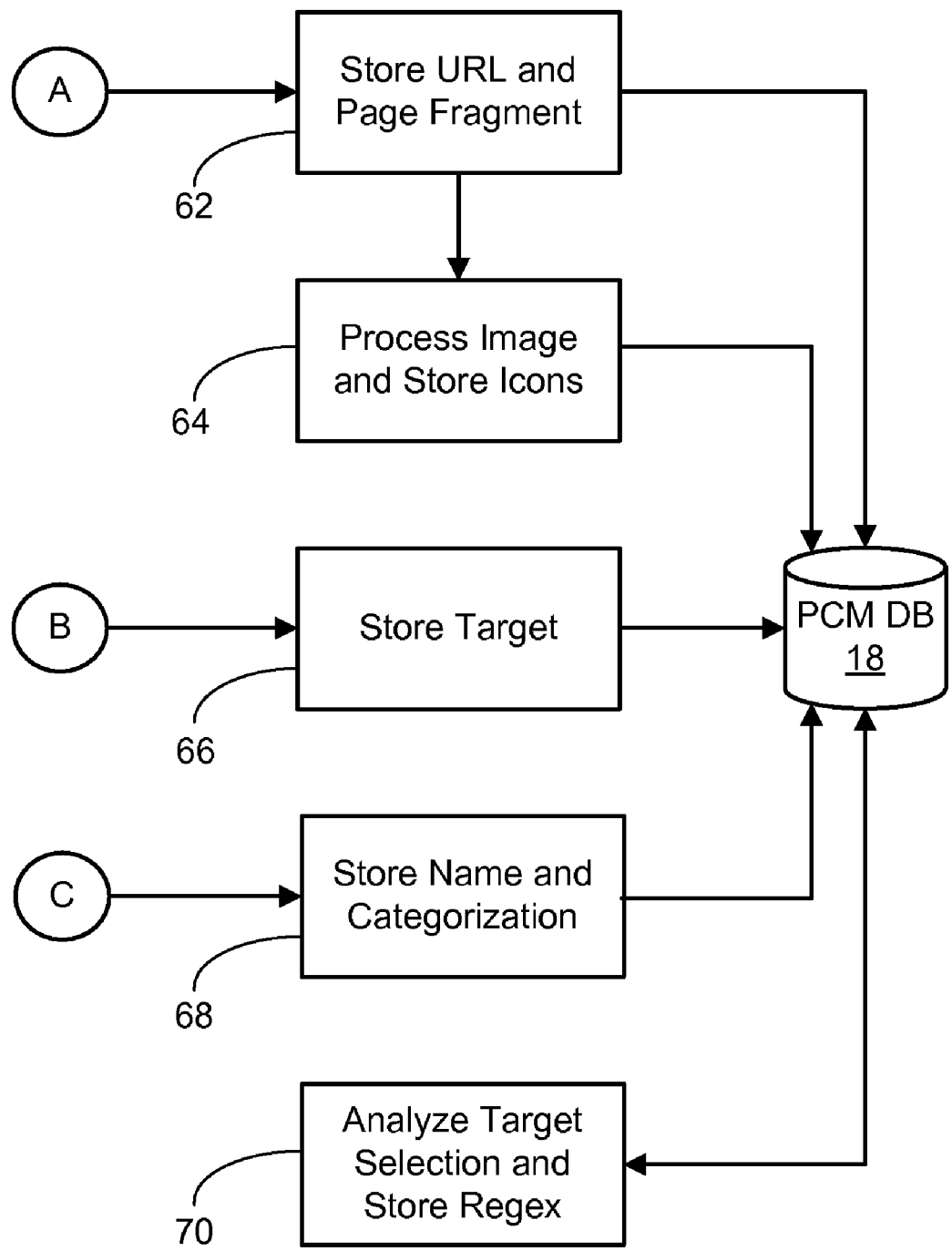
FIG. 4 a flowchart of the function of a PCM site.

Referring now to FIG. 4 a flowchart of the PCM site 32 is shown. At step 62 the output of step 50 of FIG. 2 is received. The URL of the website containing the page fragment of interest and the page fragment of interest is stored in PCM database 18. At step 64 any icons selected to indicate if information remains read or unread in the channel is processed to reformat it to the desired size for user interface 25 and stored in PCM database 18.

At step 66 the target selected at step 56 of FIG. 3 is received and stored in PCM database 18. The information defining the URL of the website containing the target information and the target information is stored in PCM database 18

At step 68 the name and categorization of the new channel provided by step 60 of FIG. 3 is stored in PCM database 18.

As can be appreciated by one skilled in the art if the information required to complete steps 62, 64, 66 and 68 is not provided to PCM site 32 processing will end and a channel will not be created. If all information is provided step 70 is invoked and is described with reference to FIG. 5.

Figure 5:
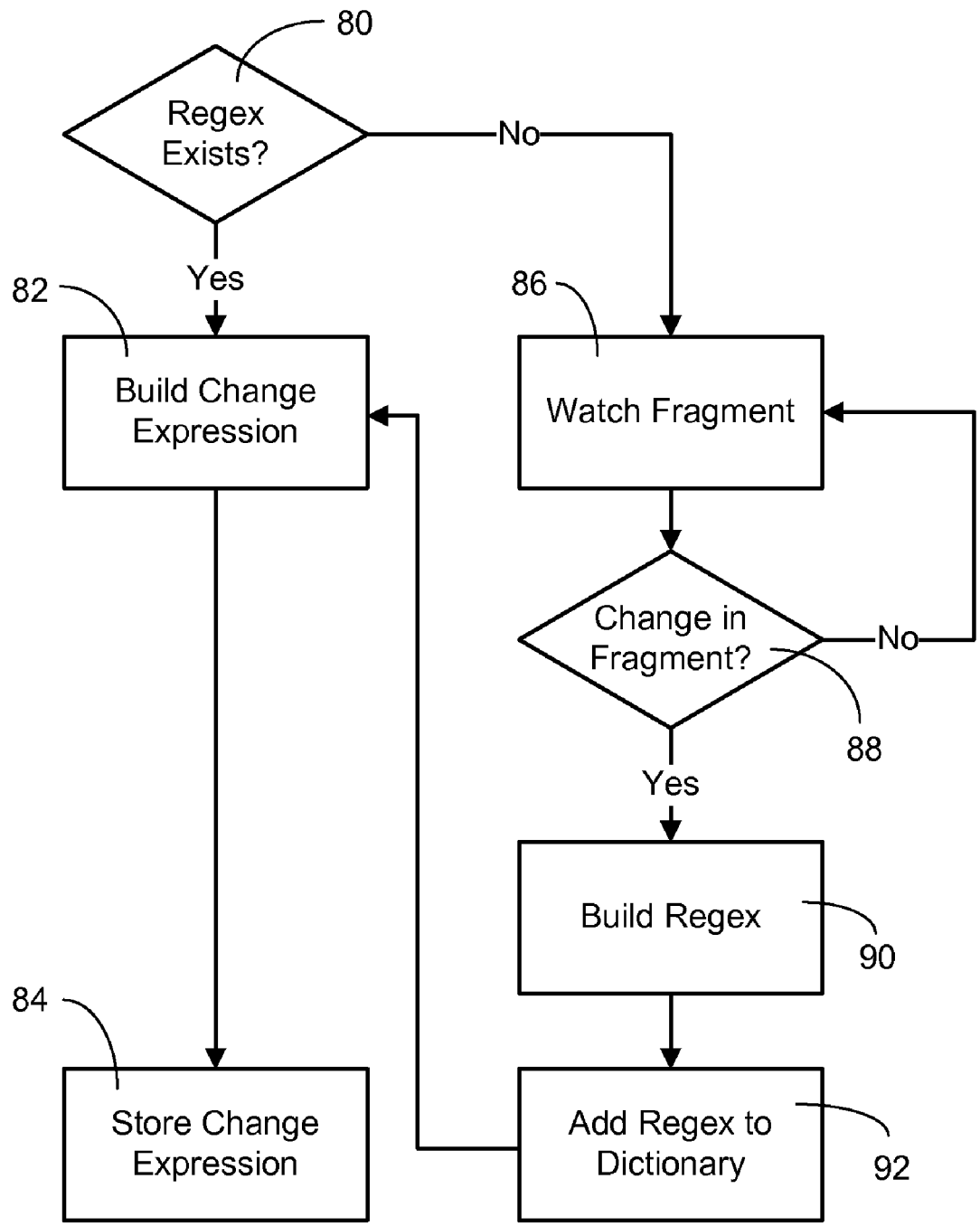
FIG. 5 is a flowchart of the function of a selection analyzer.

Referring now to FIG. 5 a flowchart of the function of a selection analyzer is shown, this corresponds to the function implemented by step 70 of FIG. 4. Beginning at step 80 a test is made to determine if the fragment of interest matches a regular expression (regex). A regular expression is well known in the computing arts and can take on many forms. In essence it is a string of characters that describes or matches a set of strings, depending upon the syntax used. A set of regular expressions is stored in an HTML pattern dictionary (not shown). The HTML pattern dictionary is stored in PCM database 18 and comprises entries for regular expressions (regexs) that match dynamic content between static demarcation tags or content. Examples would be:

a) regexs that match a variety of standard, common and previously encountered date/time text strings such as "last updated Thurs. Jan. 11, 2007".
b) regexs of typical HTML tag sequences such as <a>, <div>, <tr>, <td> and others.
c) computed regexs created by the selection analyzer as shown beginning at step 86 of FIG. 5.

If a matching regex is found at step 80, processing moves to step 82 where a change expression is built utilizing the text in the fragment of interest that precedes the regex located, the regex located, and text in the target selection that follows the regex located. Processing then moves to step 84 where the change expression is stored in PCM database 18 for use by Push Channel Monitor 28.

Returning to step 80 if a regex is not found in the HTML pattern dictionary, processing moves to step 86. At step 86 the fragment of interest is monitored on a regular basis while polling the website on which it resides at a user configurable rate, for example every 30 minutes. At this step, in order to provide feedback to the user that a channel is being created, a temporary icon is created on the user interface 25 of mobile device 12 such as an unread icon with a question mark on it. When the icon is selected a message such as "Channel Activation Not Complete" would be displayed.

After each polling attempt a test is made at step 88 to determine if a change has occurred in the fragment of interest. If a certain number of detected changes have been found (perhaps two to three) and they are of the same format, processing moves to step 90. This step involves comparing samples with a constant prefix and suffix to the substrings contained between them. The substrings are then compared to create a regex substring including "match any" operators in the regex.

At step 90 a regex is built based upon the changes identified in step 86, keeping the static information in the page fragment and utilizing wildcards such as ".*" to match changing information. At step 92 the newly created regex is stored in the pattern dictionary in PCM database 18. Over time regex entries will build up in the pattern dictionary thus saving time in creating a change expression. Processing then moves to step 82 where utilizing the new regex a change expression is created. Processing then moves to step 84 where the change expression is stored in PCM database 18 for use by Push Channel Monitor 28.

Figure 6A:
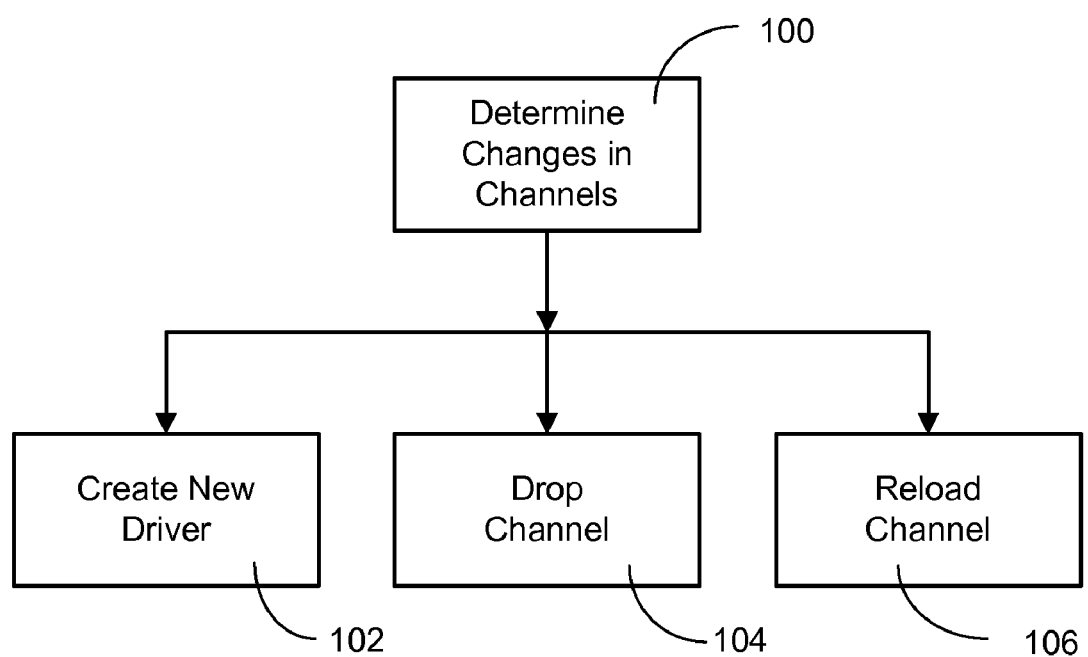
FIGS. 6a and 6b are flowcharts of the processes of a push channel monitor.
Figure 6B:
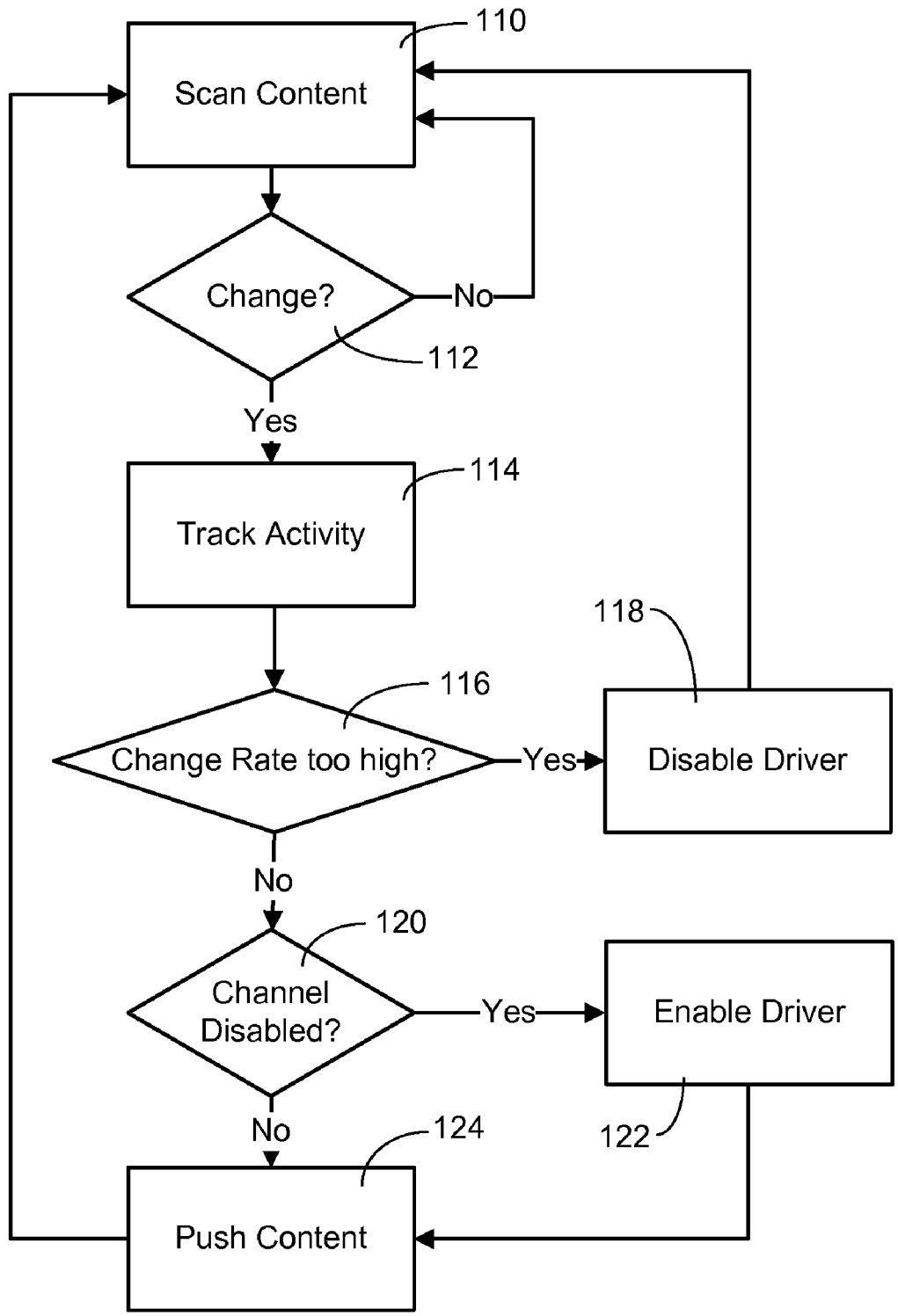

Referring now to FIGS. 6a and 6b flowcharts of the processes of a push channel monitor are shown. Beginning with FIG. 6a a process for maintaining channels is shown. As discussed earlier PCM database 18 contains information defining a channel. Beginning at step 100 the definitions of the channels the last time the process was run are compared with the current definitions stored in PCM database 18. If a new channel is found, processing moves to step 102 where a new channel driver is created. Each channel has a channel driver associated with it for the purpose of monitoring changes on that channel in order to instruct IP Proxy 26 to push information. This process of determining what to push is described in FIG. 6b. If a channel has been deleted processing moves to step 104 where the channel driver is deleted. If the channel is an existing channel, processing moves to step 106 where the channel definition in the driver is reloaded (as it may have changed) and any subscriber information is updated. A channel definition comprises the channel definition data stored in PCM database 18 which is copied to a memory resident object instantiated by the channel and controlled by the channel driver. Step 100 runs continually looking at the list of channels and determining the appropriate action to take.

Referring now to FIG. 6b a process for pushing content to a channel is shown. As described earlier each channel has its own channel driver. Beginning at step 110 the channel driver for a channel scans for any changes to content on a web page as found in WWW database 16 (a URL of the WWW), utilizing the change expression stored in PCM database 18. At step 112 a test is made to determine if a change has occurred. If not processing returns to step 110. If a change has been detected processing moves to step 114 where the change activity for the channel is tracked. The purpose of this is to determine if content changes for this channel may be exceeding thresholds that indicate the changes being pushed may be utilizing too many system and network resources. At step 116 a test is made to determine if the change rate is beyond a desired threshold. If this is the case processing moves to step 118 where the channel driver is disabled. An example of disabling a channel driver would include abnormal amounts of traffic to a channel that could be interpreted as a Denial of Service (DOS) attack by the change target website. After step 118 no changed content is pushed and processing returns to step 110. If at step 116 it is determined that the change rate is not beyond a desired threshold, processing moves to step 120. At step 120 a test is made to determine if the channel driver has been disabled. If not, processing moves to step 124 where an indication of the changed content is sent to IP Proxy 26 to have the content pushed to all subscribers of the channel. If at step 120 it is determined that the channel has been disabled, it is reenabled at step 122 and processing moves to step 124. From step 124 processing returns to step 110.

Referring now to FIG. 7 a screen mockup of a channel management interface is shown generally as 130. Channel management interface 130 may be accessible to a user through user interface 25 or to a system administrator via security, administration and policy manager 34. FIG. 7 serves as an example of the type of information that may be presented in creating or modifying a channel.

Feature 132 indicates a portion of the screen that may be used to add a new channel as an alternative to having the user select a page fragment and change target by selecting text. In field 134 a name for the new channel is entered. In field 136 a title for the channel is entered. In field 138 a channel category is entered or selected from a set provided. In field 140 the URL of an icon to indicate unread items is entered. In field 142 the URL of an icon to indicate read items is entered. In field 144 the URL of the page to monitor for changes is entered. In field 146 the change expression to determine if changes of interest have occurred is entered. The fields of feature 132 correspond to the information entered by the user or generated by the system as described in FIGS. 2 through 5.

Feature 148 illustrates a table of the information on channels, the information being modifiable with the correct security authority. Column 150 contains the name field, column 152 contains the title field, column 154 contains the category field, column 156 contains the URL of the unread icon, column 158 contains the URL of the read icon, column 160 contains the URL of the page to monitor for changes and column 162 contains the change expression. The information displayed in feature 148 is provided to aid the reader in understanding the information stored in PCM database 18 to define a channel.

Although embodiments of the invention have been described as being implemented in software, one skilled in the art will recognize that embodiments may be implemented in hardware as well. Further, it is the intent of the inventor to include computer readable forms of the invention. Computer readable forms meaning any stored format that may be read by a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A system for allowing definition of a channel for pushing information to a computing device utilizing wireless technology, said system comprising:
   said computing device, comprising a resident mobile browser, said mobile browser comprising:
      a page fragment selection tool for allowing selection of a fragment of a website, said selected fragment being information on said website, said selected fragment being forwarded to a push channel manager site;
      a change target selection tool for allowing selection of information on said website to be pushed on said channel should a change in said selected fragment occur, said selected information being forwarded to said push channel manager site; and
      a user interface for allowing utilization of said page fragment selection tool and said change target selection tool; and
   a channel manager comprising one or more computing devices comprising a plurality of distributed components, said plurality of components comprising:
      a web server comprising said push channel manager site, wherein said push channel manager site receives said selected fragment and said selected information from said computing device and creates channel definition information therefrom, said creating said channel definition information comprising generating a regular expression by:
         monitoring said fragment on a regular basis while polling the website that comprises said fragment; and
         upon detecting a predetermined number of changes in said fragment of the same format:
            if an existing regular expression to match said changes in said fragment resides in a push channel manager database, utilizing said existing regular expression as part of said channel definition information; or
            if an existing regular expression does not reside in said push channel manager database, generating a regular expression to match the detected changes in said fragment;
      said push channel manager database for storing said channel definition information;
      a push channel monitor for detecting changes in said selected fragment using said regular expression; and an IP Proxy for pushing said selected information to said wireless device when changes in said selected fragment have been detected by said push channel monitor using said regular expression.

2. The system of claim 1, said mobile browser further comprising:
a cache for storing information received from said IP proxy.

3. The system of claim 1, said components further comprising:
a security and administration policy manager for the purpose of determining who may create and access said channel.

4. The system of claim 1, wherein said IP proxy further comprises:
a change target transcoder.

5. The system of claim 1 wherein said user interface permits selection of a predefined channel to receive content of interest.

6. The system of claim 1 further operable to present, during said polling, a temporary icon on said user interface of said computing device utilizing wireless technology, said icon for providing a user notification that channel creation is underway.

7. The system of claim 6 further operable to:
upon selection of said temporary icon, providing a user notification that channel activation is not complete.

8. A computer implemented method for allowing definition of a channel for pushing information to said a computing device utilizing wireless technology, the method comprising the steps of:
obtaining a selection of a website of interest;
obtaining a selection of a fragment of said selected website, said selected fragment being information on said website; and
obtaining a selection of information on said website to be pushed on said channel should a change in said selected fragment occur;
sending said selections to a channel manager site to define said channel;
storing said selections as channel definition information in a push channel manager database;
analyzing said fragment by:
monitoring the fragment on a regular basis while polling the website that comprises said fragment; and
upon detecting a predetermined number of changes in said fragment of the same format:
if an existing regular expression to match said changes in said fragment resides in said push channel manager database, utilizing said existing regular expression as part of said channel definition information; or
if an existing regular expression does not reside in said push channel manager database, generating a regular expression to match the detected changes in said fragment,
said regular expression for subsequent use in determining whether said selected fragment has changed; and
storing said regular expression in said push channel manager database as part of said channel definition information.

9. The method of claim 8, further comprising the step of:
prompting for name and categorization information on said channel and sending the name and categorization information to said push channel manager site.

10. The method of claim 8, further comprising the step of:
monitoring changes in channel information in said push channel manager database and taking one of three actions:
a) creating a new channel driver;
b) dropping a channel; or
c) reloading a channel.

11. The method of claim 8, further comprising the steps of:
tracking the rate of changes of said fragment;
if said rate is above a threshold, disabling said channel.

12. The method of claim 11, further comprising the step of:
if said rate is not above said threshold and if said channel is disabled, reenabling said channel.

13. The method of claim 8, further comprising the step of:
permitting selection of a predefined channel to receive content of interest as an alternative to defining a new channel.

14. The method of claim 8, further comprising the steps of:
monitoring said fragment for changes; and
if a change in said fragment has occurred, pushing said selected information on said channel.

15. The method of claim 8, further comprising the steps of:
monitoring said fragment for changes; and
if a change in said fragment has occurred, pushing said selected information on said channel.

16. The method of claim 8 wherein said generating of said regular expression comprises keeping static information of said fragment and using a wildcard character to represent changing information of said fragment.

17. The method of claim 8, further comprising:
tracking a rate of changes of said fragment;
upon determining that said rate is not above a threshold, pushing content defined by said selected information on said channel to said computing device.

18. A physical computer medium, said medium including computer executable instructions which, when executed on a web server, cause said web server to:
receive a request to define a channel, said request comprising:
a selection of a website of interest;
a selection of a fragment of a website, said selected fragment being information on said website; and
a selection of information on said website to be pushed on said channel should a change in said selected fragment occur;
analyze said fragment by:
monitoring the fragment on a regular basis while polling the website comprising said fragment; and
upon detecting a predetermined number of changes in said fragment of the same format: and
if an existing regular expression to match said changes in said fragment resides in a push channel manager database, utilizing said existing regular expression as part of channel definition information; or
if an existing regular expression does not reside in said push channel manager database, generating a regular expression to match the detected changes in said fragment; and
store said regular expression for use in determining whether said selected fragment has changed.

19. The medium of claim 18 further comprising instructions to permit selection of a predefined channel to receive content of interest as an alternative to defining a new channel.

* * * * *